No. 696,087. Patented Mar. 25, 1902.
G. A. SCHOELLER.
AMMUNITION CONVEYER OR RAMMER FOR GUNS.
(Application filed Jan. 2, 1902.)
(No Model.) 7 Sheets—Sheet I.
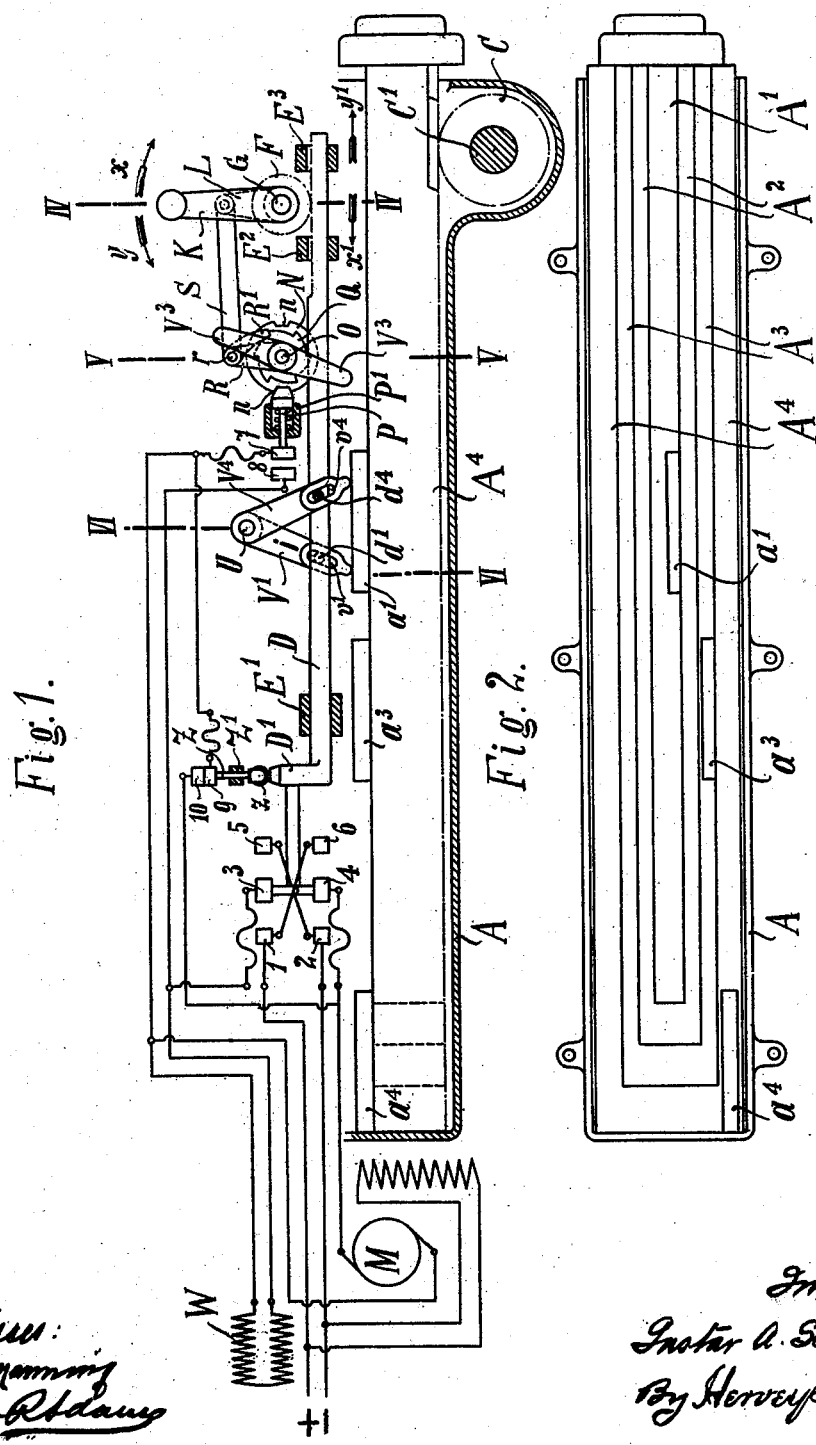

No. 696,087. Patented Mar. 25, 1902.
G. A. SCHOELLER.
AMMUNITION CONVEYER OR RAMMER FOR GUNS.
(Application filed Jan. 2, 1902.)
(No Model.) 7 Sheets—Sheet 2.
Fig. 3.
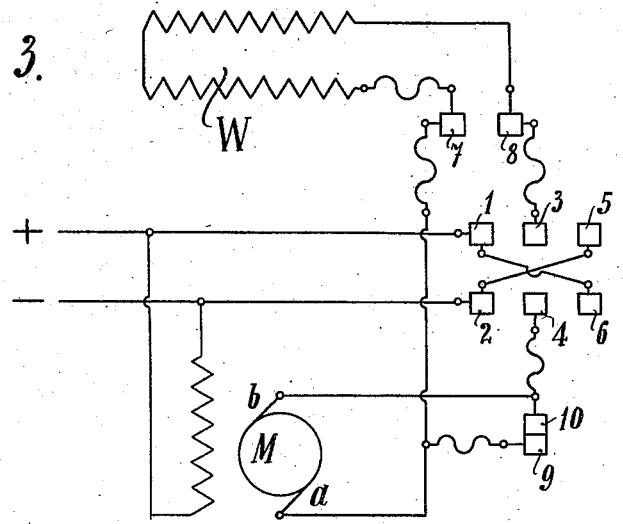
Fig. 3ª.
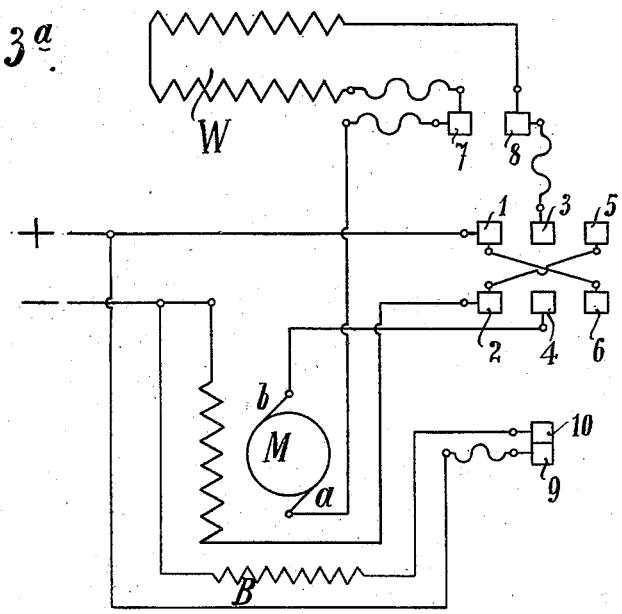

No. 696,087. Patented Mar. 25, 1902.
G. A. SCHOELLER.
AMMUNITION CONVEYER OR RAMMER FOR GUNS.
(Application filed Jan. 2, 1902.)
(No Model.) 7 Sheets—Sheet 3.
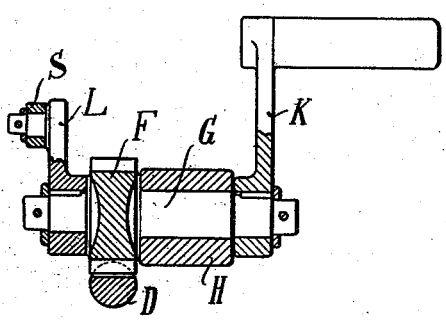
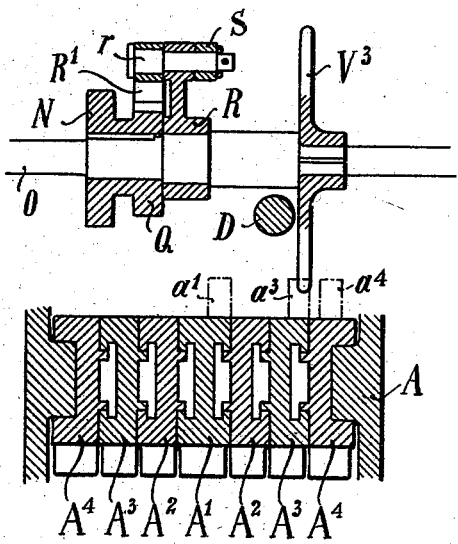
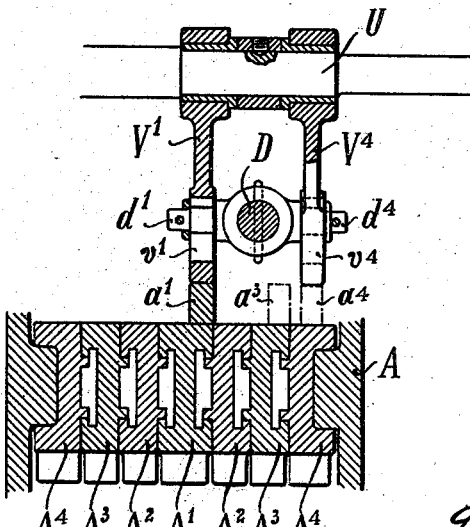

No. 696,087. Patented Mar. 25, 1902.
G. A. SCHOELLER.
AMMUNITION CONVEYER OR RAMMER FOR GUNS.
(Application filed Jan. 2, 1902.)
(No Model.) 7 Sheets—Sheet 4.
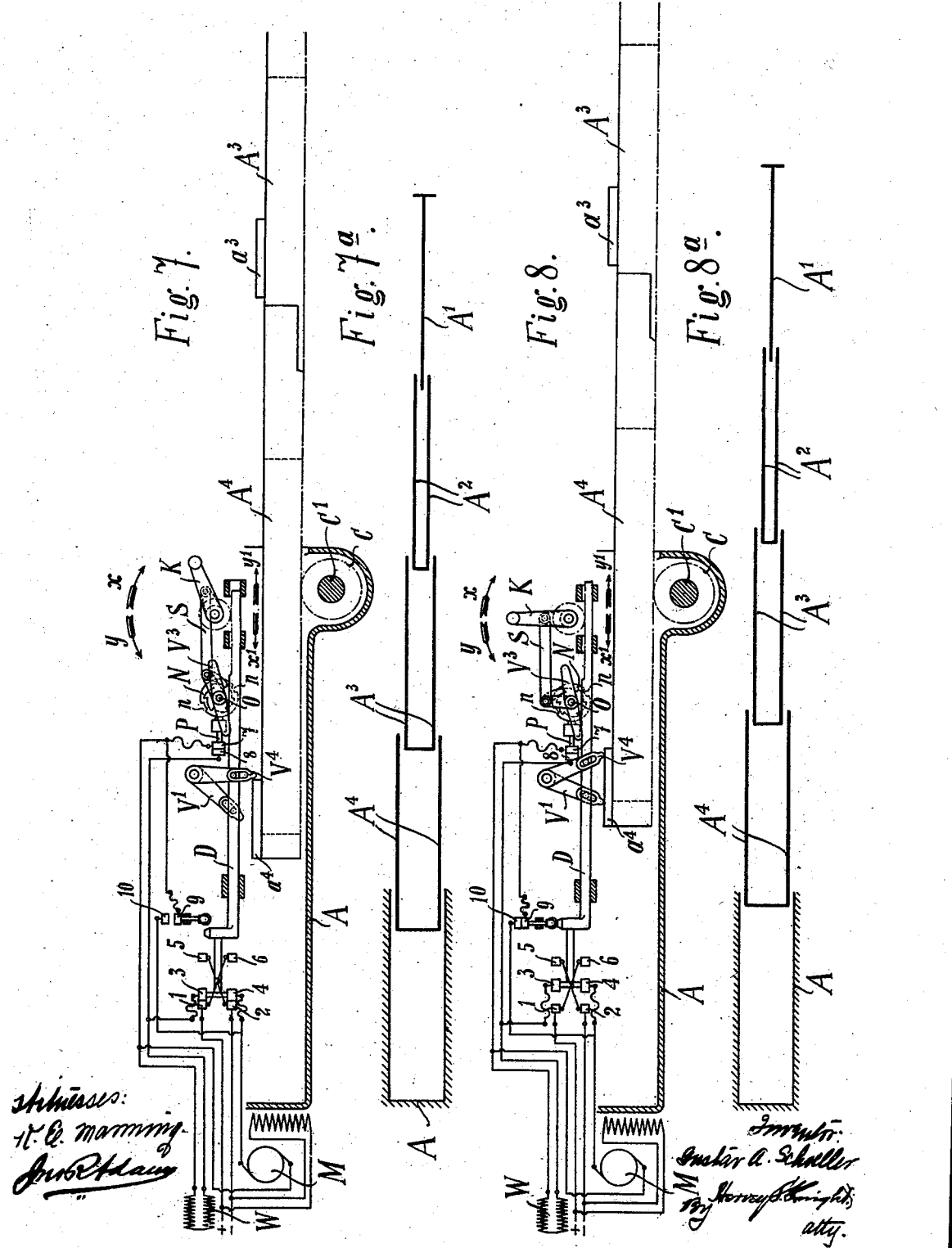

No. 696,087. Patented Mar. 25, 1902.
G. A. SCHOELLER.
AMMUNITION CONVEYER OR RAMMER FOR GUNS.
(Application filed Jan. 2, 1902.)
(No Model.) 7 Sheets—Sheet 5.
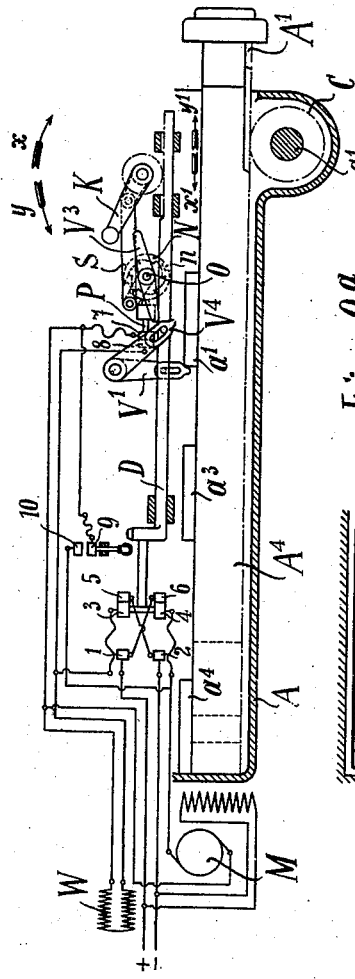
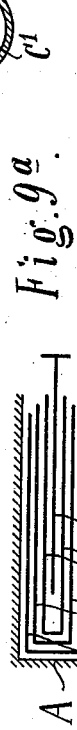
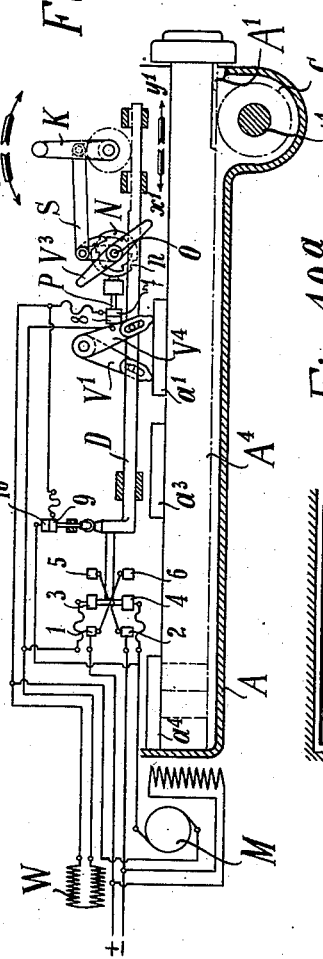
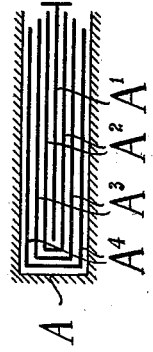

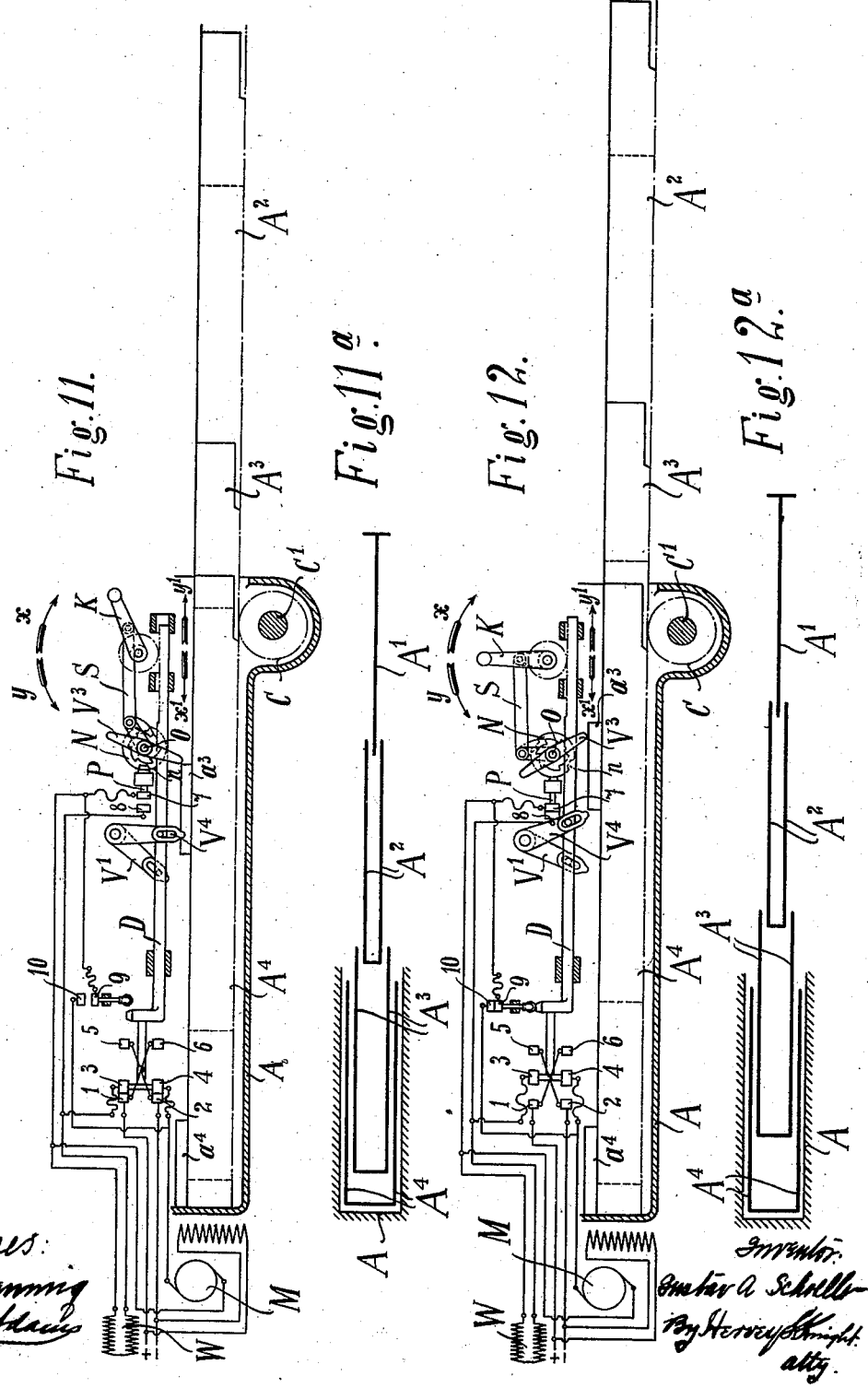

No. 696,087. Patented Mar. 25, 1902.
G. A. SCHOELLER.
AMMUNITION CONVEYER OR RAMMER FOR GUNS.
(Application filed Jan. 2, 1902.)
(No Model.) 7 Sheets—Sheet 7.
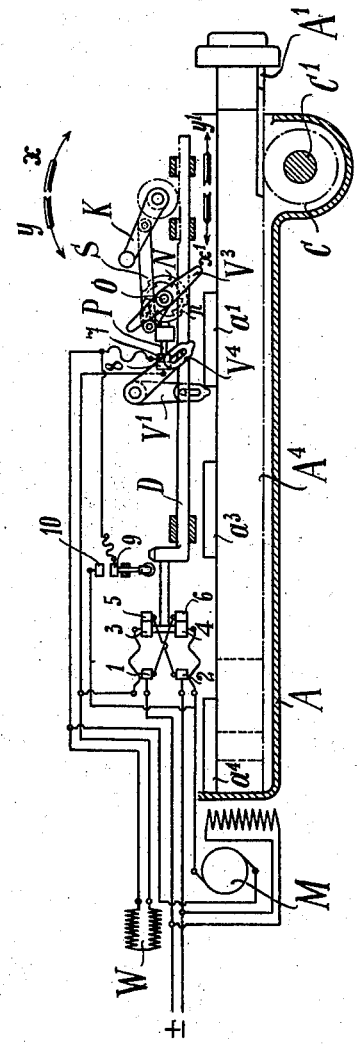
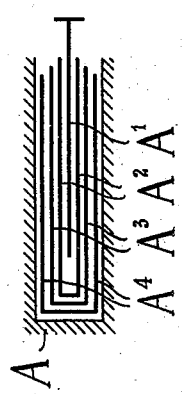

UNITED STATES PATENT OFFICE.

GUSTAV A. SCHOELLER, OF MÜLHEIM-ON-THE-RUHR, GERMANY, ASSIGNOR TO FRIED. KRUPP, OF ESSEN, GERMANY.

AMMUNITION CONVEYER OR RAMMER FOR GUNS.

SPECIFICATION forming part of Letters Patent No. 696,087, dated March 25, 1902.

Application filed January 2, 1902. Serial No. 88,098. (No model.)

*To all whom it may concern:*

Be it known that I, GUSTAV A. SCHOELLER, engineer, residing at 2 Gustavstrasse, Mülheim-on-the-Ruhr, Germany, have invented certain new and useful Improvements in Ammunition Conveyers or Rammers for Guns, of which the following is a specification.

The present invention has reference to ammunition conveyers or rammers actuated by electric motors, and has for its object to supply a controlling-gear by which the rammer is automatically stopped at the proper instant. This object is attained according to the present invention by one or more pair of stops, one member of each pair being movably attached to the conveyer-case in such a manner that it will impart its motion to the controlling-bar of the motor, while the other member of each pair is rigidly attached to the rammer itself, so that during the ramming it strikes the movable stop and causes the return of the controlling-bar to its position of rest for stopping the motor.

The nature of my invention will best be understood when described in connection with the accompanying drawings, in which—

Figure 1 represents a side view of the rammer with the controlling-gear in its position of rest before ramming the projectile. Fig. 2 is a top view of the conveyer. Fig. 3 is a diagrammatic view of a shunt-wound motor and the switching arrangement therefor. Fig. 3ª is a similar diagrammatic view of a switching arrangement corresponding to Fig 3, but as adapted for a series-wound motor. Figs. 4, 5, and 6 are vertical sections on the lines IV IV, V V, and VI VI of Fig. 1 on an enlarged scale and looking from the left at Fig. 1. Figs. 7 to 13 illustrate the most prominent positions taken in succession by the rammer and by the controlling apparatus during one operation of ramming the projectile and the cartouche, the forward part of the rammer being broken off in some of the views. Figs. 7ª to 13ª are views corresponding to Figs. 7 to 13, illustrating diagrammatically the several positions of the conveyer or rammer on a smaller scale.

Similar letters of reference and numerals of reference designate corresponding parts throughout the several views of the drawings.

The construction and mode of operation of the rammer itself are well known and need not be entered into more fully at present. In the present case the rammer shown and described is assumed to be the same as that shown in my prior patent, No. 631,999, dated August 29, 1899, the details not immediately connected with the present invention being omitted in the drawings of this present application.

Referring now to the drawings, the rammer illustrated consists of a system of telescopically-arranged rack-bars $A'$ $A^2$ $A^3$ $A^4$, which are successively moved out of the casing A and returned into the same by a pinion C, which is secured to a shaft $C'$, journaled in the rammer-casing A and actuated by the electric motor M. The direction in which the motor turns for moving the rammer outwardly will in the following description be designated as the "forward motion." The direction in returning the racks to the casing will be designated as the "backward motion." The foremost teeth of the racks $A^2$ $A^3$ $A^4$ are somewhat shortened, so that when the racks are all pushed in the pinion C engages only with the first rack $A'$ and when turned forward pushes only this rack $A'$ forward out of the casing. The remaining racks are successively brought into the path of the pinion C by bolts attached to the racks and engaging grooves in the preceding bars, premature forward motion of the racks caused by friction between the same being prevented by suitable means. Retrograde movement of the racks when pushed out is automatically prevented by spring-pawls connected to the racks $A^2$, $A^3$, and $A^4$ and passing behind lugs on the preceding bars. When the rammer is pushed inwardly, the said racks are automatically uncoupled in succession by the release of the pawls.

The motor used for actuating the conveyer may be a shunt-wound motor or a series-wound motor. In the further description the switch-diagram for the shunt-wound motor, which for the sake of clearness is separately shown in Fig. 3 in a somewhat different form from Fig. 1, will be further explained.

The switching mechanism consists of the usual arrangement of contact-pieces 1, 2, 3, 4, 5, and 6. Of these contact-pieces those diagonally opposite, as 1 and 6 as well as 2 and 5, are electrically connected and fixed, while the contact-pieces 3 and 4 are insulated from each other and movable together in such a manner that they are either brought into contact with the contact-pieces 1 and 2 for causing the forward movement of the motor and consequent pushing out of the rammer, or they may be brought into contact with the contact-pieces 5 and 6 to close the circuit for the backward movement of the motor, so as to return the racks into the casing. To the contact-piece 1 is connected the wire leading to the positive pole and to the piece 2 the wire leading to the negative pole of the source of electricity. The contact-piece 4 is electrically connected to the brush $b$ and the contact-piece 3 to the brush $a$ of the motor M. Into the conduit leading from the contact-piece 3 to the brush $a$ are inserted a movable contact-piece 7 and a fixed contact-piece 8, to which a resistance W is connected, which latter is short-circuited by closing the contact 7 8, while by opening of this contact said resistance is inserted or thrown into the circuit. It is apparent that in the latter case the speed of the motor is decreased. Two additional contact-pieces 9 and 10 are electrically connected with the brushes $a$ and $b$, the one 9 being movable. These pieces serve as means to short-circuit the motor-anchor for the purpose of braking the motor.

For the purpose of putting the motor out of circuit at the completion of every outward or inward motion of the rammer and to very rapidly braking—that is to say, stopping the motor by short-circuiting of the anchor-armature circuit—the movable contact-pieces 3 and 4 are moved out of contact with the contact-pieces 1 and 2, respectively, 5 and 6, and thereupon contact is established between the movable circuit-closers 9 and 10. Simultaneously therewith the circuit-closing pieces 3 and 4 are locked against immediate retrograde movement, so as to insure a regular alternating adjustment of the motor for forward and backward motion. In charging the cartouche the opening of the contacts 1 3 and 2 4 and the immediately-following closing of the contact 9 10 are effected automatically at even a shortened stroke of the rammer. Furthermore, for effecting the forward movement of the rammer on its shortened stroke at a smaller velocity the controlling apparatus automatically moves the contact-piece 7 back and forth in such a manner that the resistance W is inserted into the circuit only for the operation of pushing the cartouche into the barrel, while during all other movements of the rammer the resistance is short-circuited.

When in place of a shunt-wound motor a series-wound motor is used, the arrangement shown in Fig. 3ª is employed. This construction differs essentially from the above-described construction only by the provision of a separate electric brake, which is thrown into action by the closing of the contact 9 10 when the motor is thrown out of action. In other respects the arrangement and action remain the same as in the case of a shunt-wound motor.

The construction of the controlling-gear is as follows: The controlling-bar D, Fig. 1, on which the contact-pieces 3 and 4 are secured with proper electrical insulation, is supported and slides within three guides $E'$, $E^2$, and $E^3$, fixed on the rammer-casing. At its end nearest to the rammer-head said bar is provided with teeth engaged by a pinion F, Figs. 1 and 4, which pinion is mounted on the shaft G, journaled in a bearing H, fixed on the rammer-casing. At one end of the shaft G is mounted a hand-lever K, which is in an upright or central position when the motor is at rest. By turning the lever from its central position from left to right—that is to say, in the direction of arrow $x$, Fig. 1—the controlling-bar D slides in the direction of arrow $x'$ and closes the contacts 1 3 and 2 4, so that the motor is started forward and the rammer is pushed outwardly. If the hand-lever K is turned from its central position to the left—that is to say, in the direction of arrow $y$—a movement of the controlling-bar is caused in the direction of arrow $y'$ and the contacts 3 5 and 4 6 are closed, thus causing the motor to be started in a reverse direction and the rammer forced backwardly.

For the purpose of insuring an automatic throwing out of action of the motor whenever the rammer is pushed out to the full stroke and at each return movement thereof and for insuring a regularly-alternating throwing into action of the motor for forward and backward movement the following provisions are made, reference being had to Figs. 1, 2, and 6: To the racks $A^4$ and $A'$ are secured lugs $a^4$ and $a'$, and upon the shaft U, fixed upon the rammer-frame, there are rotatively mounted on opposite sides of the controlling-rod D two vibrating levers $V^4$ and $V'$, which in a vertical position project into the path 5 of the lugs $a^4$ and $a'$ and have slots $v^4$ and $v'$. Pins $d^4$ and $d'$, secured to the controlling-rod D, engage these slots, and consequently a sliding movement of the controlling-rod causes vibratory movement of the levers $V^4$ and $V'$, while a vibratory movement of these levers in either direction causes the rod D to be shifted back and forth. In the position of rest both levers $V^4$ and $V'$ are symmetrically inclined to the controlling-rod and are beyond the paths of the lugs $a^4$ and $a'$. When the controlling-rod D is moved in the direction of the arrow $x'$ (forward movement of the motor) by means of the hand-lever K, the lever $V^4$ is brought into a vertical position. (See also Fig. 7.) When the rammer is pushed outwardly nearly to the termination of its stroke, the lug $a^4$ strikes the lever $V^4$ and returns it to its original position, thereby shifting the rod D forward in the direction of the arrow $y'$, thus throwing the motor out of action and stopping the movement of the rammer. As shown in Fig. 8, the lug $a^4$ is now directly beneath the lever $V^4$ and locks it against turning in the direction of the hands of a watch. By these means the controlling-rod D is likewise prevented from sliding in the direction of the arrow $x'$, and consequently the motor can be thrown into action only for return movement. If for the last-mentioned purpose the rod D is shifted in the direction of the arrow $y'$, the lever $V'$ is brought into vertical position. (See Fig. 9.) Shortly before completion of the inward movement of the rammer the lug $a'$ strikes against the lever $V'$ and turns it in the direction of the hands of a watch, whereby the controlling-bar D is moved in the direction of the arrow $x'$ and the motor is thrown out of action and the rammer brought to a standstill. The lug $a'$ remains beneath the lever $V'$ and locks it against turning in a direction opposite to the hands of a watch, and consequently the controlling-bar can be moved only in the direction of the arrow $x'$, and the motor can only be thrown into action for forward movement.

For the purpose of short-circuiting the armature by means of the contacts 9 10 at each throwing out of action of the motor, so as to brake the latter, the carrier Z, Fig. 1, of the contact-piece 9 is made to slide within a guide $Z'$ and is provided with a roller $z$ at its lower end. The controlling-rod D has a projection $D'$, which is beveled in two directions and at the central position of the rod is located exactly beneath the roller $z$, so as to keep the contact 9 10 closed. When the controlling-rod D is moved from its central position in either direction, the projection $D'$ releases the roller, and thus allows the carrier to descend and open the contact 9 10, and thereby removing the short-circuiting of the motor-armature.

For the purpose of automatically shortening the stroke of the rammer when charging a cartouche—that is, at each second moving out of the rammer—the following arrangement, Figs. 1, 2, 4, and 5, is provided: The rack $A^3$ is provided also with a lug $a^3$, similar to those upon the racks $A^4$ and $A'$, and upon a shaft O, rotatively mounted in the rammer-casing, a stop $V^3$, having the form of a double-armed lever, is secured in such a manner that in an approximately vertical position it projects into the path of the lug $a^3$, so that when the rammer is pushed out and shortly before the completion of its stroke (shortened by the desired measurement corresponding to the length of the cartouche) the lug $a^3$ must strike the downwardly-extending arm of the lever $V^3$. By turning the shaft O the lever $V^3$ may now be brought into the path of the lug $a^3$ or out of the path of the same. This turning of the shaft O is effected automatically from the shaft G of the controlling mechanism through an intermediate ratchet-gear. For this purpose a shifting ratchet-wheel Q is secured on the shaft O, which wheel is engaged by a spring-pawl $R'$, carried by a pin $r$ on an arm R, loosely mounted on said shaft O. When the arm R is turned in the direction of the hands of a watch, the spring-pawl $R'$ engages the teeth of the ratchet-wheel Q, turning the shaft O in the same direction, while during the reverse motion of the lever R the pawl slides over the teeth of the wheel without turning the shaft O. The lever R is connected to a crank L, secured on the shaft G by a connecting-rod S engaging the pin $r$. In consequence of this arrangement a turning movement of the shaft G in the direction of arrow $x$—it is to say, in the direction of the hands of a watch—causes the shaft O to turn in the same direction, while the turning of the shaft G in the direction of arrow $y$ (opposite to the direction of the hands of a watch) does not cause turning of the shaft O. The throw of the controlling-lever K required for the backward-and-forward movement of the controlling-rod D is sixty degrees on each side of its position of rest. Corresponding to this the ratchet-wheel Q has six teeth, so that at each movement of the controlling-lever K in the direction of arrow $x$ the shaft O is turned through sixty degrees and that after each third shifting one of the arms of the lever $V^3$ projects into the path of the lug $a^3$. As will be explained hereinafter, this takes place every time that the motor is thrown into action for pushing in the cartouche. When the lug $a^3$ strikes the arm of the lever $V^3$, (see also Fig. 11,) which projects into the path, the lever is carried along and the shaft O turned in a direction opposite to the movement of the hands of a watch. Through the intermediate connections Q, $R'$, and R, connecting-link S, and crank L the shaft G is turned in the direction of arrow $y$, so that the controlling-rod D is moved in the direction of arrow $y'$ and the motor is thrown out of action. The lug $a^3$ then remains beneath the lever $V^3$ (see also Fig. 12) and locks it and at the same time the shaft O against turning in the direction of the hands of a watch. Therefore the ratchet-lever R and the shaft G cannot turn in the said direction, $x$, but only in the opposite direction, $y$, and the motor can only be thrown into action for backward movement. In this way accidents are avoided which might arise from throwing the motor into action for wrong movement, and thus extending the rammer too far after the cartouche has already been rammed.

To reduce the speed of the rammer when working with shortened stroke by switching the resistance W into the armature-circuit, the following arrangement is provided, (see Fig. 1:) The carrier P of the contact 7 is made to slide in a guide $P'$ and by means of a spring is kept constantly pressed against the edge of a disk N, which is rigidly connected to the ratchet-wheel Q. Upon the periphery of the disk N there are arranged two recesses $n\ n$ diametrically opposite each other and provided with sloping sides, into which recesses the correspondingly-formed end of the contact-carrier P is adapted to enter. The entrance of the carrier P into either of the recesses $n\,n$ opens the contact 7 8. If, on the contrary, the carrier P rests against the edge of the disk N, the contact 7 8 is closed. By turning the disk N the resistance W can therefore be either switched in or short-circuited. The position of the recesses $n\,n$ now is so chosen that a recess comes opposite the contact-carrier P every time the tappet-lever $V^3$ projects into the path of the corresponding lug $a^3$. In this way the resistance W is always switched into the armature-circuit when the motor is thrown into action for ramming a cartouche.

The handling and mode of operation of the above-described controlling-gear in charging a projectile and a cartouche will now be described with reference to Figs. 1 and 7 to 13, respectively, 2 and $7^a$ to $13^a$.

Before charging the projectile the various parts of the conveyer and switching-gear are in the positions indicated in Figs. 1 and 2, the rammer is pushed in, the controlling-lever K and the controlling-rod D are in their central positions, the contacts 3 1, 4 2, 3 5, 4 6, and 7 8 are open, and the contact 9 10 is closed. The motor M is thus thrown out of action and the armature short-circuited, the levers $V^4$ $V'$ are in their inclined central positions, and the lever $V'$ rests upon the lug $a'$, so that the motor can be started in a forward direction only. One of the arms of the lever $V^3$ projects into the path of the lug $a^3$. For charging the projectile the hand-lever K is turned downwardly in the direction of arrow $x$, whereby the controlling-bar D is moved in the direction of arrow $x'$. (See Fig. 7.) By this movement the contact 9 10 is opened and the short-circuit of the armature broken. Furthermore, the contact 1 3 as well as 2 4 are closed. Consequently the motor is started for a forward movement. Finally, the lever $V^4$ takes its vertical position and at the same time the disk N is shifted through one-sixth of a revolution by the pawl and ratchet and the inclined lateral face of the recess $n$ acting upon the correspondingly-formed end of the contact-carrier P and pushing the latter outwardly until its end bears against the edge of the disk N. By this operation the contact 7 8 is closed and the resistance W short-circuited. The turning of the disk N, respectively of the shaft O, also throws the lever $V^3$ out of the path of the lug $a^3$, and consequently the forward movement of the rammer now takes place at normal speed and at full stroke. Shortly before the complete pushing out of the last rack $A^4$ the lug $a^4$ strikes the lever $V^4$ (the racks of the rammer at this instant being in the positions shown in Figs. 7 and $7^a$) and through the lever $V^4$ pushes the controlling-rod back into the middle position, while the stroke of the rammer is completed, Figs. 8 and $8^a$. By this movement the motor is thrown out of action, its armature short-circuited by the closing of the contact 9 10, and the hand-lever K is returned to its vertical position. This movement of the hand-lever, however, has no influence on the ratchet device, and consequently the resistance W remains short-circuited and the tap-lever $V^3$ remains outside the path of the lug $a^3$. As the lever $V^4$ now rests upon the lug $a^4$ the motor is locked against a second switching for forward movement. For the purpose of pushing the rammer in, the hand-lever K is turned down in the direction of arrow $y$. (See Fig. 9.) This movement does not influence the ratchet-gear, and therefore the resistance W remains short-circuited and the tap-lever $V^3$ is still out of the path of the lug $a^3$, but the controlling-rod D is moved in the direction of arrow $y'$, thereby breaking the contact 9 10 for the short-circuiting of the armature, the contacts 3 5 as well as 4 6 are closed, and the lever $V'$ brought into a vertical position. The motor now runs backward and the rammer is pushed in at normal speed. When the racks $A^4\,A^3\,A^2$ are completely pushed in and the rack $A'$ is almost completely in, as shown in Figs. 9 and $9^a$, the lug $a'$ of the rack $A'$ strikes the lever $V'$ and returns the controlling-rod D backwardly into its central position in the direction of arrow $x'$, while at the same time the inward movement of the conveyer is completed. (See Figs. 10 and $10^a$.) The contacts 3 5 and 4 6 are thereby opened, the contact 9 10 is closed, and the motor thrown out of action and braked by the short-circuiting of the armature. At the same time the hand-lever K is returned to its vertical central position, and as the ratchet device is operating in this direction of motion the disk N is turned through an angle of sixty degrees. In this position of the disk N, neither of the two recesses being opposite to the contact-carrier P, the resistance W is still short-circuited by the contact 7 8. The tap-lever $V^3$ is still outside of the path of the lug $a^3$, while the lever $V'$ rests upon the lug $a'$ and prevents a repeated starting of the motor on backward movement. In order to ram the cartouche, the hand-lever K is turned downwardly from its central position in the direction of the arrow $x$ (see Fig. 11) a second time. By this movement, in a manner similar to that effecting the charging of the projectile, the short-circuiting of the armature is broken and the motor started in its forward movement. At the same time the ratchet device turns the disk N through one-sixth of a revolution, and one of its recesses $n$ comes opposite the contact-carrier P, and the latter passes into said recess, thereby opening the contact 7 8—that is to say, the resistance W is inserted into the armature-circuit and the speed of the rammer reduced. In conjunction with the disk N the tap-lever $V^3$ is likewise turned, and thereby brought into the path of the lug $a^3$. In consequence of this movement after the rack-bars A' A² are completely pushed out and while the rack-bar A³ is moving outward the lug $a^3$, attached thereto, strikes the tap-lever V³. The racks at this instant have assumed the position shown in Figs. 11 and 11ª. During the time that the rammer is being pushed outwardly a little further distance the lug $a^3$ turns the lever V³, together with the disk N, and by the medium of the ratchet device also turns the hand-lever K back into the position shown in Fig. 10. The motor is consequently stopped at a shortened stroke of the rammer. (See Figs. 12 and 12ª.) The contact-carrier P is withdrawn from the recess $n$ of the disk N and causes the closing of the contact 7 8, thereby short-circuiting the resistance W. The inadvertent insertion of the motor into the circuit for forward motion is prevented by the lever V³, which rests upon the lug $a^3$. The rammer must now again be pushed in. For this purpose the hand-lever is turned downwardly from its central position in the direction of arrow $y$, Fig. 13, for a second turn. This operation, as in the case of returning the rammer after charging the projectile, Fig. 9, does not affect the ratchet movement, the controlling-bar D alone being moved in the direction of the arrow $y'$. The motor after removing the short-circuiting of the armature is now inserted for backward motion, and since the resistance W remains short-circuited the rammer is pushed in at normal speed. When shortly before completion of the inward movement of the last rack-bar A' the racks assume the positions shown in Figs. 13 and 13ª, the lug $a'$ of the bar A' strikes the vertically downward projecting lever V', and while the rammer is still being pushed farther in stops the motor in the same manner as described in connection with the charging of the projectile, Figs. 9 and 10. The hand-lever K is thereby returned to its central position and the disk N turned through one-sixth of a revolution, so that now the same recess $n$, as in Fig. 11, comes opposite to the contact-carrier P and the contact 7 8 is opened. Since the lever V³ is symmetrical relative to its point of pivoting and the recesses $n\ n$ are congruent, the several parts now assume the positions shown in Fig. 1, and consequently the operations are repeated in the same manner during subsequent charging of the projectiles and cartouches.

What is claimed as new is—

1. In an ammunition conveyer or rammer for ordnance, the combination of a system of telescopically-arranged rack-bars, a pinion-wheel engaging successively said rack-bars, an electric motor operating said pinion-wheel, and a controlling-bar for throwing said motor into or out of action, with at least one pair of stops, one stop of each pair being rigidly attached to the rammer itself and moving therewith, while the other stop is movably attached to the rammer-casing so as to be in the path of the rigid stop and engages the controlling-bar, substantially as and for the purpose specified.

2. In an ammunition conveyer or rammer for ordnance, the combination of a system of telescopically-arranged rack-bars, a pinion-wheel engaging successively said rack-bars, an electric motor operating said pinion-wheel, and a controlling-bar for throwing said motor into or out of action, with at least one pair of stops, one stop of each pair being rigidly attached to the rammer itself and moving therewith, while the other stop is movably attached to the rammer-casing so as to be in the path of the rigid stop and engages the controlling-bar, said two stops being adapted to form a lock against returning of the controlling-bar immediately from its position of rest to a working position which would cause a continuation of the motor movement terminated, substantially as and for the purpose specified.

3. In an ammunition conveyer or rammer for ordnance, the combination of a system of telescopically-arranged rack-bars, a pinion-wheel engaging successively said rack-bars, an electric motor operating said pinion-wheel, and a controlling-bar for throwing said motor into or out of action, with two pairs of stops, one stop of each pair being rigidly attached respectively to the rear and to the forward end of the rammer itself and moving therewith, while the other stop of each pair is movably attached to the rammer-casing so as to be in the path of the corresponding rigid stop and engages the controlling-bar, for stopping the motor at or near the end of the complete extending or pushing-in movement of the rammer, substantially as specified.

4. In an ammunition conveyer or rammer for ordnance, the combination of a system of telescopically-arranged rack-bars, a pinion-wheel engaging successively said rack-bars, an electric motor operating said pinion-wheel, a controlling-bar for throwing said motor into or out of action, and a controlling-lever actuating said controlling-bar, with two pairs of stops, one stop of each pair being rigidly attached respectively to the rear and to the forward end of the rammer itself and moving therewith, while the other stop of each pair is movably attached to the rammer-casing so as to be in the path of the corresponding rigid stops and engages the controlling-bar and a third pair of stops, one stop of which is rigidly attached to a central part of the rammer and moving therewith, while the other stop by means of a ratchet device connected to the controlling-lever is during the outward movements of the rammer alternately thrown into the path of the corresponding rigid stop, for automatically stopping the motor at a shortened outward stroke of the rammer, substantially as specified.

5. In an ammunition conveyer or rammer for ordnance, the combination of a system of telescopically-arranged rack-bars, a pinion-wheel engaging successively said rack-bars, an electric motor operating said pinion-wheel, a controlling-bar for throwing the motor into or out of action, and a controlling-lever actuating the controlling-bar with a resistance alternately inserted in the armature-circuit during the outward movements of the rammer by means of a ratchet device connected to the controlling-lever, for automatically decreasing the speed of the rammer substantially as specified.

In testimony whereof I have hereunto set my hand in the presence of two subscribing witnesses.

GUSTAV A. SCHOELLER.

Witnesses:
WM. ESSENWEIN,
PETER LIEBER.